Nov. 27, 1923. 1,475,233
C. JOSEPH
AWNING WORM GEAR OPERATING DEVICE
Filed Aug. 31, 1920
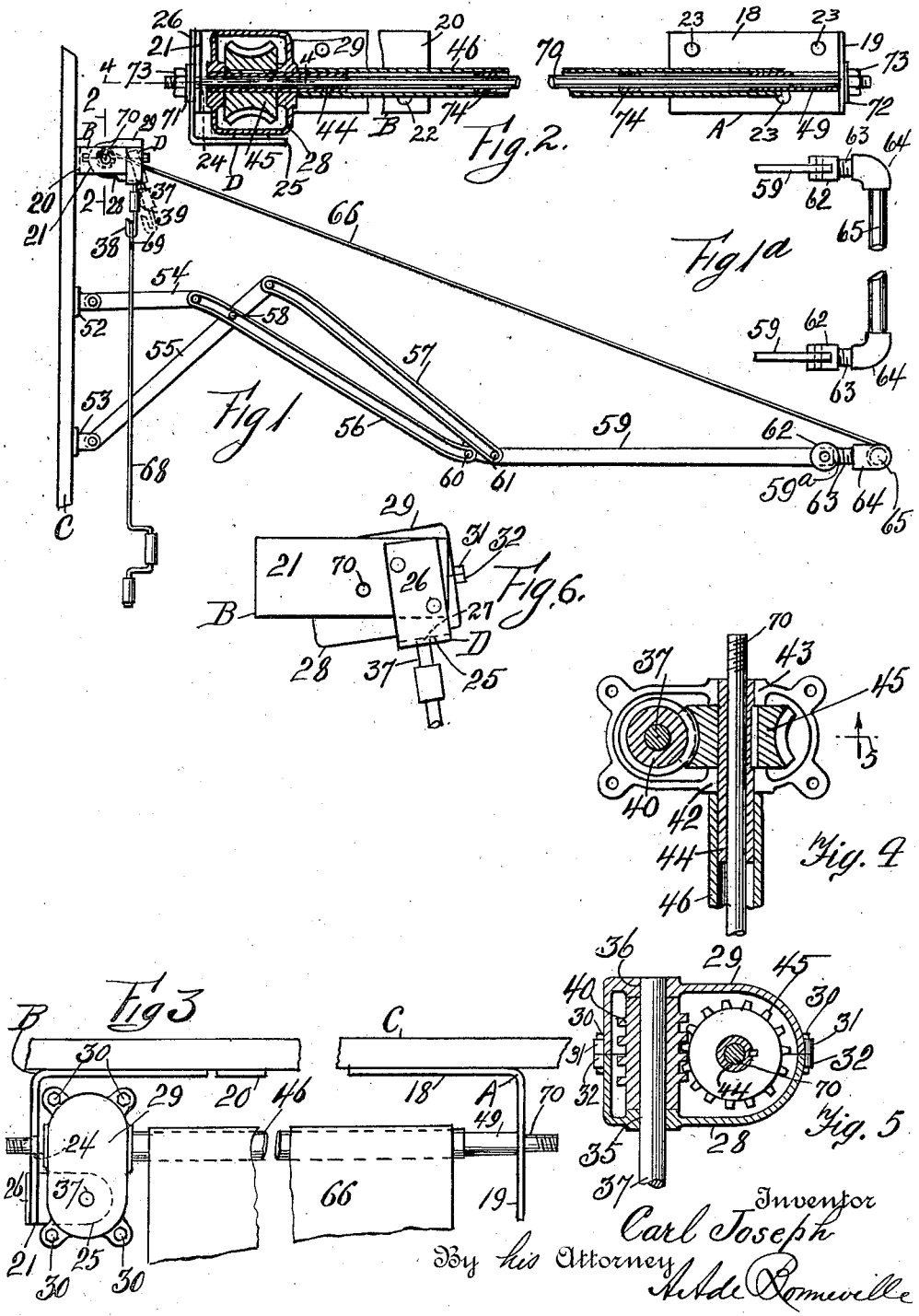
Inventor
Carl Joseph
By his Attorney Patented Nov. 27, 1923.

1,475,233

UNITED STATES PATENT OFFICE.

CARL JOSEPH, OF BAYONNE, NEW JERSEY, ASSIGNOR OF ONE-HALF TO FREDERICK J. KLOES, OF JERSEY CITY, NEW JERSEY.

AWNING WORM-GEAR-OPERATING DEVICE.

Application filed August 31, 1920. Serial No. 407,099.

*To all whom it may concern:*

Be it known that I, CARL JOSEPH, citizen of the United States, and resident of Bayonne, in the county of Hudson and State of New Jersey, have invented certain new and useful Improvements in an Awning Worm-Gear-Operating Device, of which the following is a specification.

This invention relates to an awning worm gear operating device. It comprises essentially a tubular roller with similar sleeves extending from its ends. A gear casing is provided in which either sleeve can be journaled, to be enabled to reverse the roller with its appurtenances. Spindles extend from the sleeves which are journaled in supporting brackets. A third bracket is fastened to one of the supporting brackets and can be positioned in different directions thereto. An operating shaft extends from the gear casing which can take various directions according to the position of the third bracket. The spindles at the ends of the sleeves can be removed and a tension rod substituted therefor, which rod extends through the roller and constitutes a supporting brace therefor.

The tension rod extending through the supporting brackets is, by means of threaded ends and nuts maintained taut and the roller can turn thereon.

Fig. 1 represents a side view of the awning worm gear operating device with its outriggers and awning; Fig. 1ª shows a top view of a portion of one end of Fig. 1; Fig. 2 shows an enlarged section as on the line 2—2 of Fig. 1; Fig. 3 is a top plan view of Fig. 2; Fig. 4 shows an enlarged section of Fig. 2 on the line 4—4; Fig. 5 represents a section of Fig. 4 on the line 5—5 and Fig. 6 shows a left hand side view of Fig. 2 with a modification.

A supporting bracket A with the legs 18 and 19 and the supporting bracket B with the legs 20 and 21 support the device. The leg 20 has formed therein the openings 22 and the leg 18 has formed therein the openings 23 for screws or bolts to fasten the brackets A and B to the wall C.

The leg 21 of the bracket B has formed therein a journal opening 24. A knee bracket with the legs 25 and 26, and which I will designate as the third bracket, has its leg 26 connected to the leg 21 of the bracket B. The leg 25 constitutes a support and has formed therein a guide opening 27. A gear casing 28 with the detachable cover 29 is supported on the leg 25. Bolts 30 connect the lugs 31 and 32 respectively formed with the cover 29 and the casing 28.

Journal bearings 35 and 36 are formed in the casing 28 and the cover 29 for the vertical operating shaft 37. A hook 38 is connected to the shaft 37 by means of a coupling 39.

A worm 40 is fastened to the shaft 37 between the bearings 35 and 36. Journal bearings 42 and 43 are formed at the junction of the casing 28 and the cover 29.

A rotating sleeve 44 has fastened thereto the worm wheel 45 and is journaled in the bearings 42 and 43. The sleeve 44 is fastened to what I will designate the regular tubular awning roller 46. The worm 40 meshes with the worm wheel 45. At the other end of the roller 46 is fastened the sleeve 49. Through the sleeves 44 and 49 and the tension roller 46 extends the tension rod 70. The latter also extends through the opening 24 in the leg 21 of the bracket B and a coaxial opening in the leg 19 of the bracket A. Washers 71 and 72, respectively encircle the ends of the tension rod 70 and nuts 73 are in threaded engagement with the rod 70 to maintain it taut. Separator rings 74 are fastened to the tension rod 70 and support the tension roller 46.

Below the awning roller 46 are located a pair of outriggers, each of which comprises a pair of brackets 52, 53 fastened to the wall C. A link 54 has one end pinned to the bracket 52 and a link 55 has one end pinned to the bracket 53. A link 56 has one end pinned to the link 54 and a link 57 has one end pinned to the link 55. The link 55 is pivoted to the link 56 by means of the pivot 58. A link 59 has one end pivoted to the links 56 and 57 by the pins 60 and 61 respectively. A forked shaped bracket 62 with the threaded shank 63 is fastened to the other ends of each of the links 59. The outer ends 59ª of the links 59 are at right angles to the longitudinal axis thereof and abut against a wall of the bracket 62 to maintain the latter in proper position. An elbow 64 is in threaded engagement with each shank 63 and a tube 65 connects the elbows 64. An awning 66 has its upper end connected to the awning roller 46 and its lower end is connected to the tube 65.

An operating rod 68 has at one end a hook 69 which locks with the hook 38 of the shaft 37.

To operate the device the rod 68 is caused to turn the operating shaft 37 and with it the worm 40. This causes the worm wheel 45 to turn and thereby the awning roller 46 turns to wind up the awning 66. At the same time the outriggers collapse and fold in the usual manner.

In Fig. 6 the invention is modified by locating the bracket D in an inclined position when fastened to the leg 21 of the bracket B. By this means the operating rod 37 is caused to take an inclined position which is desirable for some situations. The opening 27 in the bracket D constitutes a guide for operating the shaft 37.

The similarity of the ends of the roller 46 with its tension rod 70 permits the gear casing 28 with its cap 29 to be located at either end of said roller.

Various modifications may be made in the invention without departing from the spirit thereof and the present exemplification is to be taken as illustrative and not limitation thereof.

Having described my invention what I desire to secure by Letters Patent and claim is:

1. In an awning operating device the combination of a roller, a gear casing at one end of the roller, similar sleeves extending from the ends of the roller, a tension rod extending through the sleeves and roller, supporting brackets having openings for the ends of the tension rod, means to maintain the rod taut between the brackets, a third bracket fastened to one of the supporting brackets supporting the gear casing, gears in the casing with one end thereof connected to the sleeve therein, an operating shaft connected to the second gear in the casing guided in an opening in the third bracket and means to turn the operating shaft.

2. In an awning operating device the combination of a roller, a gear casing at one end of the roller, similar sleeves extending from the ends of the roller, a tension rod extending through the sleeves and roller, supporting brackets having openings for the ends of the tension rod, means to maintain the rod taut between the brackets, a third bracket fastened to one of the supporting brackets supporting the gear casing, gears in the casing with one thereof connected to the sleeve therein, an operating shaft connected to a second gear in the casing guided in an opening in the third bracket, means to turn the operating shaft, a pair of outriggers below the roller, a tube connecting the outer ends of the outriggers and a curtain with one end connected to the roller and the other end connected to said tube.

Signed at the borough of Manhattan, city of New York, in the county of New York and State of New York this 24th day of August A. D. 1920.

CARL JOSEPH.